United States Patent
Kaplan Haelion (10) Patent No.: US 10,616,231 B2
(45) Date of Patent: Apr. 7, 2020

(54) PREVENTING UNAUTHORIZED OUTGOING COMMUNICATIONS

(71) Applicant: Cyber 2.0 (2015) LTD., Yavne (IL)

(72) Inventor: Erez Kaplan Haelion, Rehovot (IL)

(73) Assignee: CYBER 2.0 (2015) LTD, Yavne (IL)

( * ) Notice: Subject to any disclaimer, the term of this patent is extended or adjusted under 35 U.S.C. 154(b) by 262 days.

(21) Appl. No.: 15/464,403

(22) Filed: Mar. 21, 2017

(65) Prior Publication Data

US 2018/0278617 A1    Sep. 27, 2018

(51) Int. Cl.
| | |
|---|---|
| *H04L 29/06* | (2006.01) |
| *G06F 9/54* | (2006.01) |
| *H04L 12/24* | (2006.01) |
| *H04L 12/26* | (2006.01) |

(52) U.S. Cl.
CPC .............. *H04L 63/101* (2013.01); *G06F 9/54* (2013.01); *H04L 41/20* (2013.01); *H04L 43/045* (2013.01); *H04L 63/0227* (2013.01)

(58) Field of Classification Search
CPC ......... G06F 9/54–546; G06F 21/52–54; G06F 21/62–629; G06F 2221/2141; H04L 41/20; H04L 43/045; H04L 63/10–101; H04L 63/20
See application file for complete search history.

(56) References Cited

U.S. PATENT DOCUMENTS

| | | | |
|---|---|---|---|
| 8,789,181 B2 | 7/2014 | Blackwell | |
| 8,949,931 B2 | 2/2015 | Ermagan et al. | |
| 9,516,053 B1 | 12/2016 | Muddu et al. | |
| 9,591,010 B1 | 3/2017 | Muddu et al. | |
| 9,596,254 B1 | 3/2017 | Muddu et al. | |
| 9,609,009 B2 | 3/2017 | Muddu et al. | |
| 9,609,011 B2 | 3/2017 | Muddu et al. | |
| 9,667,641 B2 | 5/2017 | Muddu et al. | |
| 9,699,205 B2 | 7/2017 | Muddu et al. | |
| 9,813,435 B2 | 11/2017 | Muddu et al. | |
| 9,838,410 B2 | 12/2017 | Muddu et al. | |

(Continued)

FOREIGN PATENT DOCUMENTS

| | | |
|---|---|---|
| WO | 2016196683 A1 | 12/2016 |
| WO | 2016196684 A1 | 12/2016 |

(Continued)

OTHER PUBLICATIONS

International Search Report issued in PCT/IL2017/051246 dated Feb. 22, 2018, 15 pages.

*Primary Examiner* — Kevin Bechtel (74) *Attorney, Agent, or Firm* — Tutunjian & Bitetto, P.C.

(57) ABSTRACT

A system, product and method for preventing unauthorized outgoing communications. The method comprises, in response to an attempt to transmit an outgoing communication by a transmitting software entity, obtaining a list of software entities which have performed Inter-Process Communication (IPC), directly or indirectly, with the transmitting software entity. The method further comprises for each software entity in the list of software entities, checking whether the software entity is an unauthorized software entity. In response to detecting an unauthorized software entity in the list of software entities, the outgoing communication may be blocked. As a result, the outgoing communication is prevented from being transmitted.

19 Claims, 4 Drawing Sheets

(56) References Cited

U.S. PATENT DOCUMENTS

| | | |
|---|---|---|
| 2012/0102568 A1* | 4/2012 | Tarbotton .............. G06F 21/552 |
| | | 726/23 |
| 2012/0259793 A1* | 10/2012 | Umansky ............... G06Q 10/06 |
| | | 705/348 |
| 2013/0276108 A1 | 10/2013 | Blackwell |
| 2013/0298184 A1 | 11/2013 | Ermagan et al. |
| 2014/0310811 A1* | 10/2014 | Hentunen .......... H04L 63/1441 |
| | | 726/23 |
| 2015/0278729 A1 | 10/2015 | Hu et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parandehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2017/0034018 A1 | 2/2017 | Parandehgheibi et al. |
| 2017/0063886 A1 | 3/2017 | Muddu et al. |
| 2017/0063887 A1 | 3/2017 | Muddu et al. |
| 2017/0063888 A1 | 3/2017 | Muddu et al. |
| 2017/0063889 A1 | 3/2017 | Muddu et al. |
| 2017/0063890 A1 | 3/2017 | Muddu et al. |
| 2017/0063891 A1 | 3/2017 | Muddu et al. |
| 2017/0063894 A1 | 3/2017 | Muddu et al. |
| 2017/0063896 A1 | 3/2017 | Muddu et al. |
| 2017/0063897 A1 | 3/2017 | Muddu et al. |
| 2017/0063898 A1 | 3/2017 | Muddu et al. |
| 2017/0063899 A1 | 3/2017 | Muddu et al. |
| 2017/0063900 A1 | 3/2017 | Muddu et al. |
| 2017/0063901 A1 | 3/2017 | Muddu et al. |
| 2017/0063902 A1 | 3/2017 | Muddu et al. |
| 2017/0063903 A1 | 3/2017 | Muddu et al. |
| 2017/0063904 A1 | 3/2017 | Muddu et al. |
| 2017/0063905 A1 | 3/2017 | Muddu et al. |
| 2017/0063906 A1 | 3/2017 | Muddu et al. |
| 2017/0063907 A1 | 3/2017 | Muddu et al. |
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0134410 A1 | 5/2017 | Muddu et al. |
| 2017/0134415 A1 | 5/2017 | Muddu et al. |
| 2017/0142140 A1 | 5/2017 | Muddu et al. |
| 2017/0223036 A1 | 8/2017 | Muddu et al. |
| 2017/0272458 A1 | 9/2017 | Muddu et al. |

FOREIGN PATENT DOCUMENTS

| | | |
|---|---|---|
| WO | 2016196685 A1 | 12/2016 |
| WO | 2016196686 A1 | 12/2016 |

* cited by examiner

PREVENTING UNAUTHORIZED OUTGOING COMMUNICATIONS

TECHNICAL FIELD

The present disclosure relates to computer security in general, and to preventing transmission of unauthorized communications, in particular.

BACKGROUND

Cyber attacks may target computer systems, infrastructures, computer networks, or personal computer devices by various means of malicious activities. The cyber attack may originate from an anonymous source that attempts to steal, alter, or destroy a specified target by hacking into a susceptible system. Hackers may seek to exploit weaknesses in a computer system or network to perform cyber attacks.

Securing a computer network from cyber attacks has been a significant challenge for network managers for decades. Due to increasing reliance on computer systems and networks in most societies, and the growth in using of computing devices, such smartphones, televisions and computers as part of the Internet of Things, preventing cyber attacks today is extremely important to every organization.

In some cases, hackers may install malicious software entities, such as application programs, user interfaces, device drivers, network protocol stacks, and other electronic information, that misbehave or harm the network. When a software entity misbehaves or performs malicious activities, it may cause a variety of problems for users, other software entities, and an operating system that may be managing and coordinating multiple software entities. Hence, preventing the installation and activation of the malicious software resource is an important challenge.

It is known that many hackers are able to overcome firewalls and other network-based safeguards by performing social engineering. Using social engineering, authorized personal may mistakenly allow the installation and penetration of a malicious software entity. Hence, even in the most guarded network, it is reasonable to assume that a malicious software entity may penetrate the protection layers and operate within the network.

BRIEF SUMMARY

One exemplary embodiment of the disclosed subject matter is a method comprising: in response to an attempt to transmit an outgoing communication by a transmitting software entity, obtaining a list of software entities which have performed Inter-Process Communication (IPC), directly or indirectly, with the transmitting software entity; for each software entity in the list of software entities, checking whether the software entity is an unauthorized software entity; in response to detecting an unauthorized software entity in the list of software entities, blocking the outgoing communication, whereby preventing the outgoing communication from being transmitted.

Optionally, said checking comprises checking if the software entity is a member of an authorized programs list.

Optionally, said checking comprises checking if the software entity is a member of an unauthorized programs list.

Optionally, said checking comprises checking whether the software entity is an Internet browser or a Macro-executing application.

Optionally, the method also comprises monitoring IPC between the software entities, wherein during said monitoring determining a communication graph based on the IPC, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity.

Optionally, said obtaining the list comprises analyzing the communication graph to obtain the list.

Optionally, said obtaining the list comprises determining a cone of influence from a node representing the transmitting software entity, wherein the list comprises each software entity associated with a node in the cone of influence.

Optionally, the method further comprises monitoring for loading of processes executing the software entities, wherein in response to a load of a process, adding a node to the communication graph.

Optionally, each software entity is selected from the group consisting of: a dynamically-loadable code and executable code.

Another exemplary embodiment of the disclosed subject matter is a computer program product comprising a non-transitory computer readable storage medium retaining program instructions, which program instructions when read by a processor, cause the processor to perform a method comprising: in response to an attempt to transmit an outgoing communication by a transmitting software entity, obtaining a list of software entities which have performed Inter-Process Communication (IPC), directly or indirectly, with the transmitting software entity; for each software entity in the list of software entities, checking whether the software entity is an unauthorized software entity; in response to detecting an unauthorized software entity in the list of software entities, blocking the outgoing communication, whereby preventing the outgoing communication from being transmitted.

Optionally, said checking comprises checking whether the software entity is an Internet browser or a Macro-executing application.

Optionally, the method further comprises: monitoring IPC between the software entities, wherein during said monitoring determining a communication graph based on the IPC, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity, wherein said obtaining the list comprises analyzing the communication graph to obtain the list.

Optionally, said obtaining the list comprises determining a cone of influence from a node representing the transmitting software entity, wherein the list comprises each software entity associated with a node in the cone of influence.

Optionally, the method further comprises monitoring for loading of processes executing the software entities, wherein in response to a load of a process, adding a node to the communication graph.

Optionally, each software entity is selected from the group consisting of: a dynamically-loadable code and executable code.

Yet another exemplary embodiment of the disclosed subject matter is an apparatus having the processor and memory, wherein the memory having retained therein the computer.

Yet another exemplary embodiment of the disclosed subject matter is a computer program product comprising a non-transitory computer readable storage medium retaining program instructions, which program instructions when read by a processor, cause the processor to perform a method comprising: in response to an attempt to transmit an outgoing communication by a transmitting software entity, obtaining a list of software entities which have performed Inter-Process Communication (IPC), directly or indirectly, with the transmitting software entity; for each software entity in the list of software entities, checking whether the software entity is an unauthorized software entity; in response to detecting an unauthorized software entity in the list of software entities, logging in an event log an event associated with the outgoing communication, whereby generating the event log for potential future analysis.

Optionally, said checking comprises checking whether the software entity is an Internet browser or a Macro-executing application.

Optionally, the method further comprises: monitoring IPC between the software entities, wherein during said monitoring determining a communication graph based on the IPC, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity, wherein said obtaining the list comprises analyzing the communication graph to obtain the list.

Optionally, said obtaining the list comprises determining a cone of influence from a node representing the transmitting software entity, wherein the list comprises each software entity associated with a node in the cone of influence.

Optionally, the method further comprises monitoring for loading of processes executing the software entities, wherein in response to a load of a process, adding a node to the communication graph.

Optionally, each software entity is selected from the group consisting of: a dynamically-loadable code and executable code.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to prevent unauthorized software entities from transmitting outgoing communications from within a computerized network. The outgoing communication may be directed to another computer within the same network or directed outside the network, such as outside a Local Area Network (LAN) and to a web-server connectable to the LAN via the Internet.

In some exemplary embodiments, the software entity transmitting the outgoing communication may be an authorized entity that is generally authorized to transmit outgoing communications. However, the transmitting software entity may be affected by other software entities or a cascade of software entities, that one or more of them may be malicious or unauthorized. The other software entities may affect the transmitting entity by performing a direct Inter-Process Communication (IPC) with the transmitting software entity, stimulating the transmitting software entity by invoking it directly, or the like. Additionally or alternatively, the other software entities may affect is the transmitting software entity indirectly, such as by performing indirect IPC with the transmitting software entity (e.g. performing IPC with another software entity that affects the transmitting software entity, directly or indirectly).

In some exemplary embodiments, IPC may comprise programming interfaces that coordinate activities among different program processes that can run concurrently in an operating system. In some exemplary embodiments, software entities may use IPC to share data, communicate, invoking other process, or the like. IPC methods may include pipes, semaphores, shared memory, sockets, signals, invoking of Application Programming Interfaces (APIs) of processes, invoking functions in dynamically-loaded libraries or other dynamically-loadable code, or the like. In some exemplary embodiments, an invocation of a process by another process is also considered as an IPC. For example, if a first process invokes a second process, such as utilizes its API or causes the second process to be created and executed, the first process may be considered as performing an IPC with the second process. As an example, a first software entity may request data from a second software entity by an IPC; and the second software entity may respond to first software entity's request, by an additional IPC. As another example, processes on different computers on the same network may utilize sockets as a method of IPC. Sockets may be a data stream sent over a network interface, either to a different process on the same computer or to another computer on the network. As yet another example of IPC, a process may send messages to another process via a message queue.

In some exemplary embodiments, a malicious software entity may be unauthorized to transmit outgoing communications from within the computerized network. The malicious software entity may attempt to bypass this limitation by causing an authorized software entity to transmit an outgoing communication. The malicious software entity may influence the authorized software entity by accessing resources of the authorized software entity, sending a message to the authorized software entity, modifying parts of the memory of the authorized software entity, or the like. In some exemplary embodiments, the malicious software entity may perform IPC with the transmitting software entity directly to influence it to send an outgoing communication. Additionally or alternatively, the malicious software entity may cause a chain of IPC communications between a plurality of software entities. At the end of the chain may be is a transmitting software entity that is influenced to transmit an outgoing communication, as desired by the malicious software entity. It will be noted that malicious software entity may cause a transmission of a communication that otherwise would not have been transmitted. Additionally or alternatively, the malicious software entity may make use of an outgoing communication that was about to be sent regardless of the malicious software entity, by adding to its payload desired information, by modifying the payload and metadata of the outgoing communication, or using similar techniques.

Additionally or alternatively, a non-malicious software entity that is usually authorized to transmit outgoing communications, may be exploited by malicious parties to affect the (other) transmitting software entity and cause it to transmit a malicious communication. As an example, a macro-executing application may be exploited by a malicious party to execute a malicious macro. Executing the malicious macro may cause the macro-executing application to perform an IPC with a transmitting software entity and cause it to transmit an affected outgoing communication. The affected outgoing communication may be harmful to the computing device, the computer system, the network, or otherwise serve to purposes of malicious software entity and its owner.

One technical solution is to prevent outgoing communications from being transmitted, if an unauthorized software entity has performed, directly or indirectly, an IPC with the software entity that transmitted the communication. In some exemplary embodiments, in response to an attempt to transmit an outgoing communication by a transmitting software entity, a list of software entities which have performed IPC, directly or indirectly, with the transmitting software entity may be obtained. The list may comprise each software entity that performed a direct IPC with the transmitting software entity or another software entity in the list. As a result, the list may comprise each software entity that had the potential to affect the transmitting software entity to cause it to transmit the outgoing communication. Each software entity in the list of software entities may be checked to determine if it is an unauthorized software entity. In case an unauthorized software entity is detected in the list of software entities, the outgoing communication may be blocked and prevented from being transmitted.

In some exemplary embodiments, IPC between software entities may be monitored. In some exemplary embodiments, each transfer of data among processes may be monitored. Non-limiting examples of monitored IPC may be files transferred between processes, messages sent from one process to another, commands transferred from one process to another, data streams, or the like. As another non-limiting example, Dynamic-Link Libraries (DLL) may be monitored. DLL may be a dynamically-loadable code that can be loaded on the fly and linked to another process to be used thereby. A DLL may be monitored by monitoring files with an extension of .dll, .ocx (for libraries containing ActiveX controls), .drv (for legacy system drivers), or the like. Loading and linking a DLL to a process may be considered as a form of bi-directional IPC. Similarly, invoking functions or methods in a DLL by another process is also considered a bi-directional IPC.

Additionally or alternatively, loading of processes executing the software entities may be monitored. Monitoring the loading of processes may comprise monitoring executable files loaded from files systems to a memory of the computing device, load requests to a server, or the like. Upon loading of a new process, IPCs associated with the newly loaded process may be monitored.

In some exemplary embodiments, the system may be monitored and a communication graph may be maintained. The communication graph may represent IPC communications between software entities in the system. The communication graph may be a directed graph. A node of the communication graph may represent a software entity. A directed edge in the communication graph connecting between a first node and a second node, may represent an IPC initiated by a first software entity represented by the first node towards a second software entity represented by the second node. The direction of the edge may indicate that the entity associated with the outgoing node had the potential to affect the entity associated with the incoming node.

In some exemplary embodiments, when a load of a process is detected, a node may be added to the communication graph. The node may represent the software entity executed by the newly loaded process. Additionally or alternatively, for each monitored IPC, an edge may be added to the communication graph, with the respective nodes, in case they do not already exist in the communication graph. The respective nodes may represent the two software entities that communicate by the IPC represented by the edge.

In some exemplary embodiments, the communication graph may be analyzed to obtain a list of software entities having the potential to affect a target software entity. In some exemplary embodiments, the target software entity is the transmitting software entity.

In some exemplary embodiments, in order to obtain the list, a Cone Of Influence (COI) may be determined from a node representing the transmitting software entity. The COI may comprise only nodes that have a path to the node representing the transmitting software entity (i.e. nodes representing software entities that have performed a direct or an indirect IPC with the transmitting software entity). The list may comprise each software entity associated with a node in the COI of the transmitting software entity. In some exemplary embodiments, the COI may be determined by performing a backward traversal of the graph starting from the node representing the transmitting software entity. The COI may be the subset of the nodes reachable by the backward traversal.

In some exemplary embodiments, each software entity in the list of software entities may be checked to determine authorization. In some exemplary embodiments, each software entity may be checked to determine whether is a member of an authorized programs list (e.g., white list). Additionally or alternatively, each software entity may be checked to determine whether is a member of an unauthorized programs list (e.g., black list). In some exemplary embodiments, other methods to determine authorization may exist, such as based on credentials of the software entity, based on the software entity comprising identifiable malicious code, based on similarity analysis between the examined software entity and known authorized or unauthorized entities, or the like.

It will be noted that the authorization property of a software entity may be relative to its position within the cascade of software entities that participate in or have the potential to affect. The same software entity may be considered authorized when transmitting the outgoing communication and unauthorized when influencing another transmitting software entity, or vice versa.

In some exemplary embodiments, the unauthorized programs list may comprise programs that are authorized to transmit outgoing communication, but are unauthorized to affect a transmitting software entity. As an example, consider an Internet browser, a Macro-executing application or similar interpreters configured to execute third-party code. In case the Internet browser executes malicious code, it may be configured to influence, directly or indirectly, another software entity and cause it to transmit an outgoing communication. As another example, a MICROSOFT™ WORD™ software entity may execute macros that may be defined by the document it loads. A macro attack may exploit vulnerabilities in the WORD™ software entity and cause the indirect transmittal of the outgoing communication. Hence, if such a software entity is identified in the list of software entities in the COI of the transmitting software entity, a potential attack may be identified and the outgoing communication may be blocked.

In case an unauthorized software entity is detected, the outgoing communication may be blocked and prevented from being transmitted. As a result, a potential malicious outgoing communication may be prevented. In some cases, however, false positive blockage is performed and non-malicious outgoing communication may be blocked. Additional analysis of the outgoing communication may be employed to ensure that the blocked outgoing communication is indeed malicious, such as deep inspection of the payload, or the like.

One technical effect of utilizing the disclosed subject matter is to protect from malicious software entities that are executed within a computer in a network. By preventing the malicious software entity to transmit outgoing communications, its malicious activity may be partially or totally mitigated. For example, the malicious software entity may not be able to utilize vulnerabilities in other software entities executed in the computer to transmit communications on its behalf. The outgoing communications may be communications used for malicious data leak. In some exemplary embodiments, a malicious software entity may exploit the process of communication, to release confidential or private information to untrusted parties. Additionally or alternatively, the outgoing communication may be transmitted to a remote controlling device, such as operated by a malicious user, who can manually direct the malicious software entity. Additionally or alternatively, the outgoing communication may be transmitted to other devices within the network in order to infect new hosts.

Another technical effect of utilizing the disclosed subject matter is to protect from macro attacks that may be executed by authorized software entities, such as word processors, or other macro-executing applications. Similarly, runtime interpreters, such as Internet browsers, may also be protected against being exploited by third-party code.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1A:
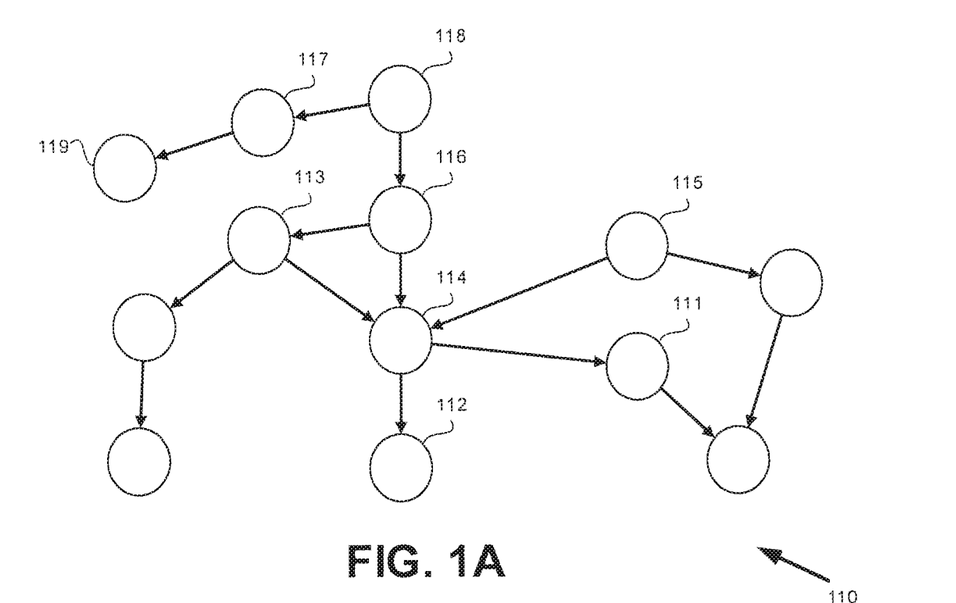
FIGS. 1A-1B show schematic illustrations of graphs, in accordance with some exemplary embodiments of the disclosed subject matter

Referring now to FIG. 1A showing a schematic illustration of a graph, in accordance with some exemplary embodiments of the disclosed subject matter.

In some exemplary embodiments, a Communication Graph 110 may represent IPC communications between software entities in a system. Communication Graph 110 may be a directed graph. A node in Communication Graph 110, such as Nodes 111-119, may represent a software entity. An edge in Communication Graph 110 may represent an IPC between two software entities. As an example, Node 118 may represent a first software entity; Node 117 may represent a second software entity; and a directed edge connecting between Node 118 and Node 117 may represents an IPC initiated by the first software entity towards the second software entity. A path in Communication graph 110 from a first node to a second node, may represent an indirect IPC from the software entity represented by the first node, towards the software entity represented by the second node. The path may be a directed path indicating that the entity associated with the first node had the potential to affect the entity associated with the second node.

In some exemplary embodiments, Communication Graph 110 may be created and maintained based on monitoring of the system. In some exemplary embodiments, monitoring of the system may comprise monitoring for loading of processes executing the software entities. A node may be added to Communication Graph 110 in response to detecting a load of a process in the Operating System (OS). The node may represent the software entity executed by the newly loaded process.

In some exemplary embodiments, the software entity loading the processes may be a dynamically-loadable code, such as a DLL, an ActiveX™ library (e.g., an OCX file), a system driver (e.g., a DRV file), a dynamic framework, a dynamic-loaded program, or the like. Additionally or alternatively, the software entity may be an executable code that is being executed.

Additionally or alternatively, Communication Graph 110 may be created by monitoring IPC between software entities. In response to monitoring an IPC from a source software entity to a target software entity, a directed edge from the node representing the source software entity to the node representing the target software entity may be added to Communication Graph 110. In some exemplary embodiments, in case the nodes do not already exist, new nodes may be added to Communication Graph 110.

In some exemplary embodiments, Node 112 may represent a transmitting software entity. In response to an attempt to transmit an outgoing communication by the transmitting software entity (Node 112), a list of software entities having the potential to affect the transmitting software entity, may be examined to determine the potential security risk associated with the outgoing communication. The list may comprise software entities which have performed IPC, directly or indirectly, with the transmitting software entity. In some exemplary embodiments, Communication Graph 110 may be analyzed to obtain the list.

Figure 1B:
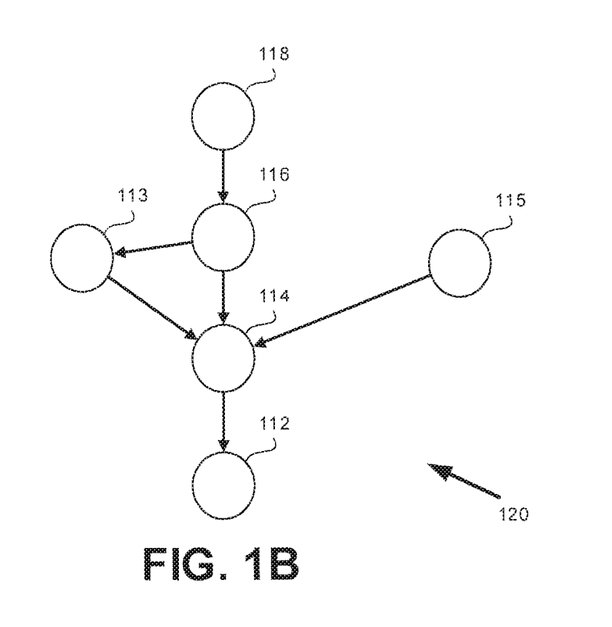

Referring now to FIG. 1B showing a schematic illustration of a graph, in accordance with some exemplary embodiments of the disclosed subject matter.

In order to obtain the list, a COI 120 of Node 112 may be determined. The list may comprise each software entity associated with a node in COI 120. In some exemplary embodiments, COI 120 may comprise each node that has a directed path Node 112. COI 120 comprises Nodes 112, 113, 114, 115, 116 and 118.

In some exemplary embodiments, COI 120 may comprise nodes representing software entities which have performed a direct IPC with the transmitting software entity, such as Node 114, which has an outgoing edge that connects Node 114 to Node 112 directly.

Additionally or alternatively, COI 120 may comprise nodes representing software entities which have performed an indirect IPC with the transmitting software entity. As an example, there is a path in Communication Graph 110 starting from Node 115 and reaching Node 112. Such a path may represent a chain of software entities that could have affected one another using monitored IPCs, and as a result, each node in the path had the potential to affect the outgoing communication transmitted by Node 112. COI 120 may comprise software entities represented by nodes performing the chain of IPCs.

In some exemplary embodiments, COI 120 may be determined by performing backward traversal of Graph 110 starting from Node 112. COI 120 may comprise the nodes that are reachable from Node 112 during backward traversal. The list may comprise the software entities associated with the nodes of COI 120.

In some exemplary embodiments, COI 120 may exclude some nodes which do not have a path in Communication Graph 110 towards Node 112. For example, Nodes 117, 119 are potentially affected by Node 118, but do not have the potential to affect Node 112 and therefore are not in COI 120. As another example, Node 111 also does not have the potential to affect Node 112 via IPCs. As a result, Node 111 is excluded from COI 120.

Figure 2A:
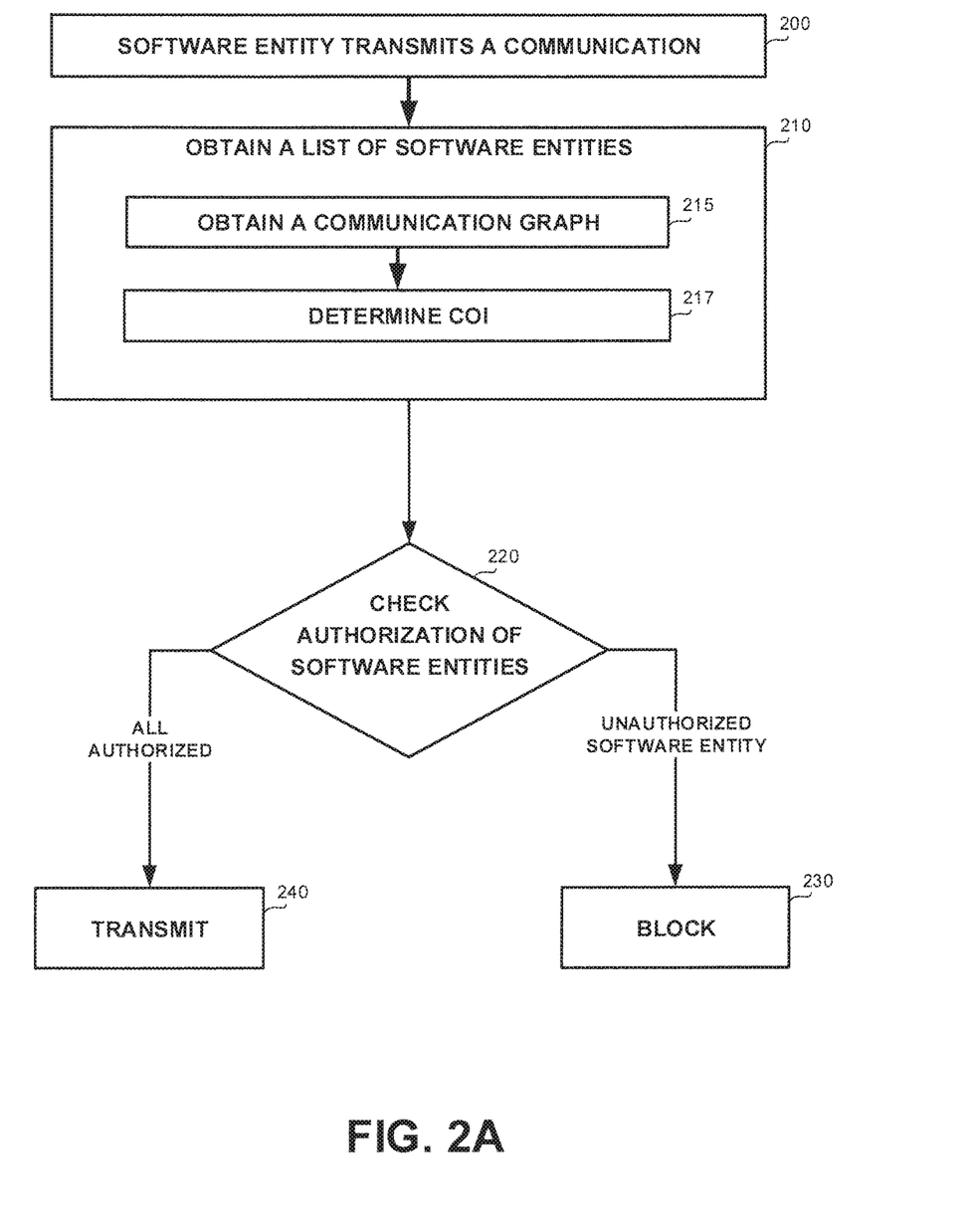
FIGS. 2A-2C show flowchart diagrams of a method, in accordance with some exemplary embodiments of the disclosed subject matter.

Referring now to FIG. 2A showing a flowchart diagram of a method, in accordance with some exemplary embodiments of the disclosed subject matter.

On Step 200, a transmitting software entity may attempt to transmit an outgoing communication.

In some exemplary embodiments, the transmitting software entity may be a software entity which is authorized to transmit outgoing communications. Non-limiting example of transmitting software entities may be Internet browsers, e-mail clients, message transfer applications, data transfer applications, or the like. Authorization may be based on rules and parameters defined by IT administrators of the system, whitelists, blacklists, malicious signature identification methods, or the like.

On Step 210, a list of software entities may be obtained. In some exemplary embodiments, the list may comprise software entities which have performed IPC, directly or indirectly, with the transmitting software entity. In some exemplary embodiments, the transmitting software entity may be potentially affected by the other software entities appearing in the list through the IPC.

On Step 215, a communication graph may be obtained. In some exemplary embodiments, the communication graph may be a directed graph representing software entities involved with the transmitting software entity by IPC, such as Communication Graph 110 in FIG. 1A. The communication graph may be obtained from a monitoring module which may iteratively construct and update the graph. Additionally or alternatively, the communication graph may be generated on demand, such as based on a log indicating events in the system which had previously occurred.

In some exemplary embodiments, the communication graph may be analyzed obtain the list. The communication graph may be analyzed to extract nodes that represent software entities that performed an IPC with the transmitting software entity.

On Step 217, a COI may be determined. In some exemplary embodiments, in order to obtain the list, a COI from the node representing the transmitting software entity in the communication graph may be determined, such as COI 120 in FIG. 1B. Each software entity in the list may be represented with a node in the COI.

On Step 220, authorization of software entities may be checked. In some exemplary embodiments, each software entity in the list of software entities may be checked to determine whether the software entity is an authorized software entity. In some exemplary embodiments, each software entity may be checked to determine if it is a member of an authorized programs list (e.g., white list). Additionally or alternatively, each software entity may be checked to determine if it is a member of an unauthorized programs list (e.g., black list). In some exemplary embodiments, other methods to determine authorization may be utilized.

In some exemplary embodiments, software entities such as Internet browsers or a Macro-executing applications, may be authorized to transmit outgoing communications. However, such software entities may be determined as unauthorized software entities, if they are not the transmitting software entities, (i.e. are unauthorized to affect a transmitting software entity). In case such software entities are not the transmitting software entity, they may be exploited by a macro attacker to cause an indirect transmittal of the outgoing communication via another transmitting software entity. Hence, if such a software entity is identified in the list of software entities in the COI of the transmitting software entity, the software entity may be considered as unauthorized.

In some exemplary embodiments, a software entity may be unauthorized to transmit outgoing communication but may be considered as authorized if appearing in a COI of another software entity that transmits outgoing communication. Hence, authorization may be context based and may differ based on the location of the software entity within the COI and its role. In some cases, a software entity may be authorized to affect specific software entities (e.g. Node 116 is authorized if it affects Node 114 but is not authorized to directly perform IPC with other nodes, such as Node 113). Additionally or alternatively, a software entity may be unauthorized to affect specific entities (e.g., Node 116 may be generally authorized but is unauthorized to directly perform IPC with Node 113).

In response to detecting an unauthorized software entity in the list of software entities, Step 230 may be performed. On Step 230, the communication may be blocked. In some exemplary embodiments, the transmitting software entity may be prevented from transmitting the outgoing communication. Additionally or alternatively, the outgoing communication may be re-routed, deceived by a honeypot, or the like. Additionally or alternatively, the event may be logged and potentially reported. In some cases, a system in accordance with the disclosed subject matter may operate in a monitoring mode and may not block the outgoing communication but only log and report it.

In case all the software entities are authorized, Step 240 may be performed. On Step 240, the communication may be transmitted. In some exemplary embodiments, the event may be logged. In some cases, the log may indicate the list of software entities for future analysis.

Figure 2B:
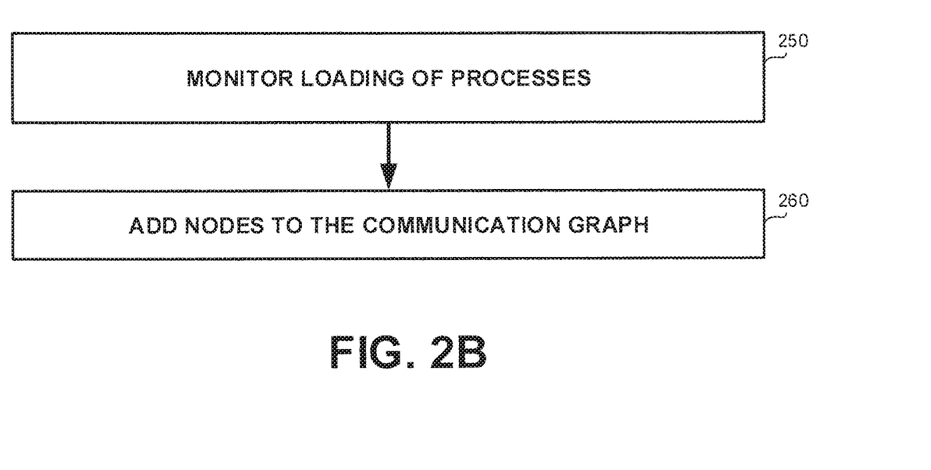

Referring now to FIG. 2B showing a flowchart diagram of a method, in accordance with some exemplary embodiments of the disclosed subject matter.

On Step 250, loading of processes executing the software entities may be monitored. In some exemplary embodiments, processes involved with the transmitting software entity may be monitored. In some exemplary embodiments, a hook in the OS may be installed to enable the monitoring of loading of processes. Additionally or alternatively, a monitoring process may repeatedly query the OS for existing processes (e.g., repeatedly perform ps command in LINUX™). Additionally or alternatively, loading of dynamically executable code may be identified.

On Step 260, nodes may be added to the communication graph based on the monitoring of Step 250. In some exemplary embodiments, in response to detecting a load of a process, a node representing the software entity associated with the loaded process, may be added to the communication graph. In some exemplary embodiments, an invoking process that invoked the loaded process may be identified and an edge may be added between the node of the invoking process and the node of the loaded process. In some exemplary embodiments, a parent-child relationships between processes may be examined to identify the invoking process. In some exemplary embodiments, edges representing IPCs associated with loaded process may be added to the communication graph.

Figure 2C:
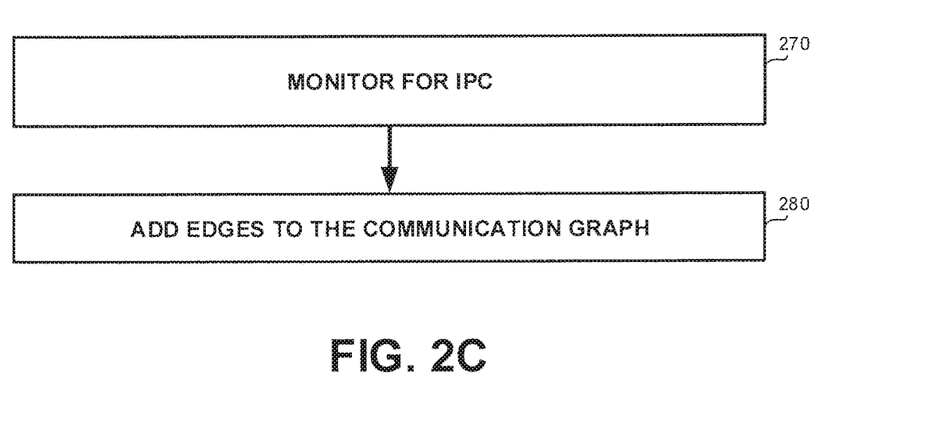

Referring now to FIG. 2C showing a flowchart diagram of a method, in accordance with some exemplary embodiments of the disclosed subject matter.

On Step 270, monitoring for IPC between software entities may be performed. The IPC may comprise mechanisms for sharing data between processes.

In some exemplary embodiments, different forms of IPC may be monitored, such as message passing, synchronization, shared memory, pipes, Remote Procedure Calls (RPC), or the like.

As an example, files accessed by loaded processes executing the software entities and monitored on Step 260, may be monitored. The files may be records stored on a disk, records synthesized on demand by a file server, or the like. In case two entities access the same file object, an IPC between the entities may be determined. The direction of the IPC may be from any entity that wrote to the file and towards any entity that read from the file. In some exemplary embodiments, several edges may be determined based on the same file. Consider three entities accessing the same file, where A and B write and read to the file and C only reads from the file. The following edges may be added: A to B, A to C, B to A and B to C.

As another example, a software entity may invoke an API of another software entity. For example, a library function in a DLL may be invoked. Such invocation may be considered as an IPC from the entity to the DLL. If the library function returns a value to the entity, it may also be considered as an IPC from the DLL to the entity. In some cases, over approximation may be performed and each DLL invocation may be considered as a bi-directional IPC.

In some exemplary embodiments, DLL may be dynamically loaded to an existing process. Such dynamic loading of a DLL may be considered as an IPC. In some cases, dynamic loading of a DLL may be considered as a bi-directional IPC. In some exemplary embodiments, DLL injection may be used to dynamically load the DLL. DLL injection may be used for running code within the address space of another process, by forcing the process to load the DLL into its address space. DLL injection may be used by malicious software entities to influence the behavior of another software entity, in a way its author did not anticipate or intend. For example, the injected code may hook system function calls, read the contents of password textboxes, or the like. In some exemplary embodiments, the injected DLL code may be invoked from the code of the process using pointers, functions, or other invocation methods that may rely on parameters that can be influenced and modified by the malicious software entity. Additionally or alternatively, DLL may be dynamically loaded to an existing process using reflection. Reflection may be the ability of a software entity to examine, introspect and modify its own structure and behavior at runtime. A reflection-oriented program component can monitor the execution of an enclosure of code and can modify itself according to a desired goal related to that enclosure. This may be accomplished by dynamically assigning program code at runtime. DLL code may be dynamically loaded using reflection, leading to the invocation of the DLL by the software entity. In some exemplary embodiments, malicious user may utilize reflection to perform a malicious activity. For example, the malicious user may be modify the DLL which the software entity is pre-configured to load and use. As another example, the malicious user may manipulate the software entity to use reflection and load a malicious DLL.

As yet another example, signals may be considered as a form of IPC. A signal may be an asynchronous system message sent from one process to another process. Signals may be used to notify a process of an event that occurred, to remotely command another process, to synchronize two processes to use another synchronous IPC, or the like. A similar form of IPC may be Asynchronous System Trap (AST). AST may refer to a mechanism used in several systems to signal events back to user processes.

As yet another example, sockets may be a form of IPC. A socket may be a mechanism for receiving or sending data stream over a network interface, either to a different process on the same computer or to another computer on the network. In some exemplary embodiments, there may be different kinds of sockets, such as datagram sockets used for connectionless communication, multicast sockets used to send to multiple nodes, address range sockets where there may or may not be any nodes to receive data, Unix domain socket which may be a data communications endpoint for exchanging data between processes executing on the same host operating system, or the like.

As yet another example, message queues may be a form of IPC. Message queues may be data streams which usually preserves message boundaries. Message queues may allow multiple processes to read and write to the message queue without being directly connected to each other.

As yet another example, pipes may be an additional form of IPC. Pipes may be unidirectional data channels. Data written to the write end of the pipe may buffered by the operating system until it is read from the read end of the pipe. In some exemplary embodiments, couples of pipes may be considered as two-way data streams between processes, i.e. a bi-directional IPC. The couples of pipes may be utilized to achieve standard input and output for the two-way communication. A similar form of monitored IPC may be anonymous pipes. An anonymous pipe may be a FIFO communication channel used for one-way IPC. A parent software entity may open anonymous pipes, and create a new process that inherits the other ends of the pipes, or creates several new processes and arranges them in a pipeline. Another similar form of monitored IPC may be named pipes. A named pipe may be a pipe implemented through a file on the file system instead of standard input and output. Multiple processes may read and write to the named pipe.

As yet another example, semaphores may be a form of IPC. A semaphore may be an abstract data type used to control access to a common resource by multiple processes. The semaphore may synchronize between the multiple processes acting on the common resource.

As yet another example, multiple processes may be given access to the same block of memory which creates a shared buffer for the processes to communicate with each other.

This block of shared memory may be a method of IPC. Shared memory may be a way of exchanging data between software entities running at the same time. Each software entity writing to the shared memory may be viewed as an origin of the IPC and each software entity reading from the shared memory may be viewed as a target of the IPC. In some exemplary embodiments, an over approximation may be performed and each process with access to the shared memory may be viewed as being both an origin and a target of the IPC. Additionally or alternatively, access permissions may be used to define origin/target of the IPC.

As yet another example, multiple software entities may communicate by message passing. The software entities may pass messages using message queues and/or non-OS managed channels, commonly used in concurrency models. Such messages may be a method of IPC.

As yet another example, memory-mapped files may be another form of IPC. A memory-mapped file may be a file mapped to RAM that may be modified by changing memory addresses directly instead of performing I/O operations. The memory-mapped file may be physically present on disk, but may also be a device, shared memory object, or other resource that the operating system can reference through a file descriptor. The correlation between the file and the memory space may permit software entities to treat the mapped portion as if it were primary memory.

As yet another example, Atom Bombing technique may be another form of IPC. Atom Bombing may be a technique to perform code injection to a process. Atom Bombing exploit Windows™ atom tables and Async Procedure Calls (APC) to inject code into a process.

In some exemplary embodiments, monitoring for IPC may comprise memory scanning of processes. The memory space may be scanned to detect injected code within a running process. Based on identifying an injected code the corresponding software entity may be identified as being a target of an IPC. If the origin of the code injection is unknown, all processes executing in the system may be considered as a potential origin, and edges from each node may be added to the communication graph.

On Step 280, edges may be added to the communication graph. In some exemplary embodiments, in response to determining an IPC initiated by a first software entity towards a second software entity, a directed edge representing the IPC may be added to communication graph. The directed edge may connect between a first node representing the first software entity; and a second node representing the second software entity. In some exemplary embodiments, adding the edge to the communication graph may comprise adding the nodes connected by the edge, if such nodes are not already part of the communication graph.

Figure 3:
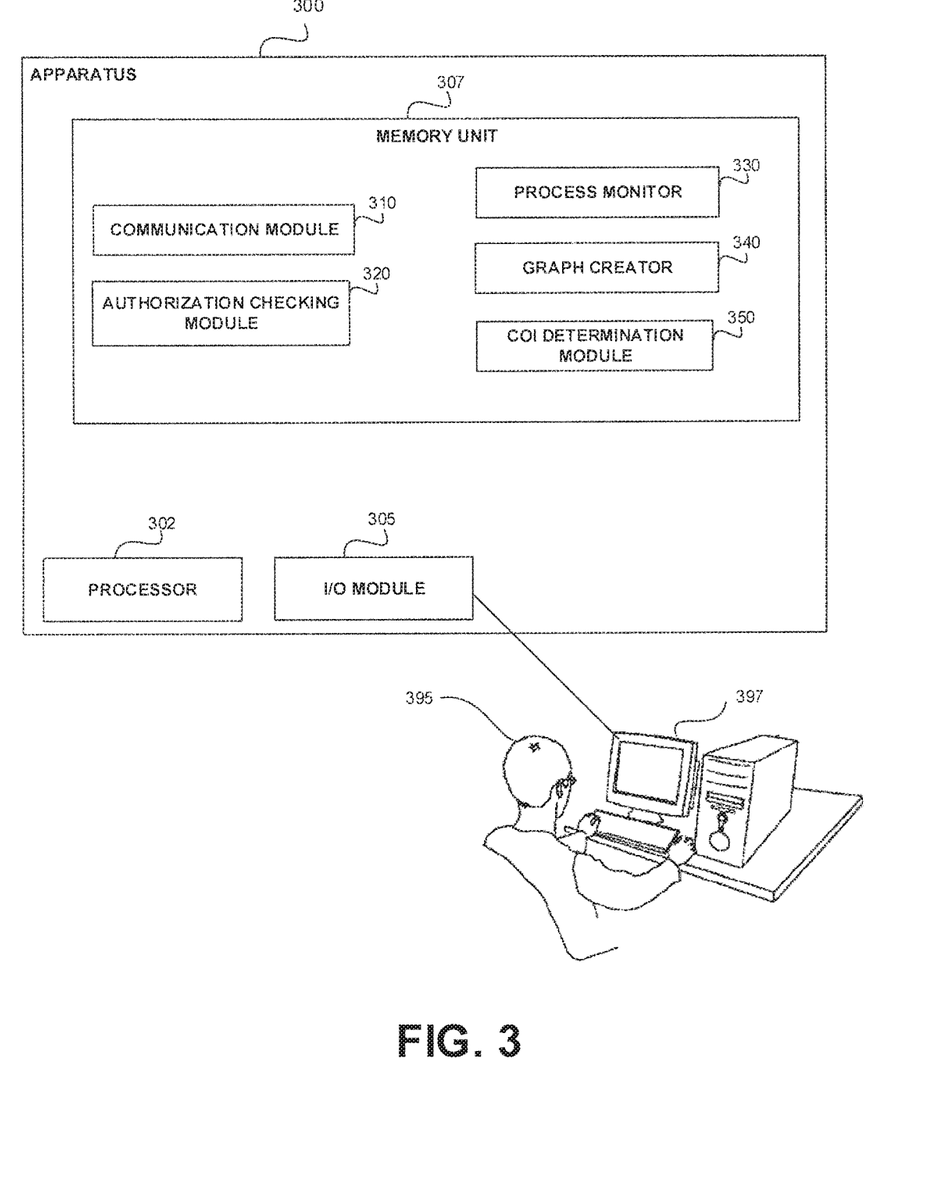
FIG. 3 shows a block diagram of an apparatus, in accordance with some exemplary embodiments of the disclosed subject matter.

FIG. 3 showing an apparatus in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) module 305. Apparatus 300 may utilize I/O Module 305 as an interface to transmit and/or receive information and instructions between Apparatus 300 and external I/O devices, such as a Workstation 397, computer networks (not shown), or the like. In some exemplary embodiments, I/O Module 305 may be utilized to provide an output to and receive input from a User 395. It will be appreciated that Apparatus 300 can operate automatically without human intervention.

In some exemplary embodiments, Apparatus 300 may comprise Memory Unit 307. Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300.

In some exemplary embodiments, a Communication Module 310 may be configured to transmit communications from transmitting software entities executed by Apparatus 300.

In some exemplary embodiments, an Authorization Checking Module 320 may be configured to analyze lists of software entities, in order to determine whether they contain an unauthorized software entity. In some exemplary embodiments, Authorization Checking Module 320 may obtain a list of software entities which have performed IPC, directly or indirectly, with a transmitting software entity. Authorization Checking Module 320 may be configured to check authorization of each software entity in the list. In some exemplary embodiments, Authorization Checking Module 320 may check if each software entity in the list is a member of an authorized programs list. Additionally or alternatively, Authorization Checking Module 320 may check if a software entity is a member of an unauthorized programs list. Additionally or alternatively, Authorization Checking Module 320 may check whether the software entity is an Internet browser, a Macro-executing application, or the like. In some exemplary embodiments, the analysis performed by Authorization Checking Module 320 may be affected by a context of the software entity, such as but not limited to its location in the communication graph, it being transmitting/non-transmitting entity, the software entities it initiated IPC directly with, the software entities that initiated IPC directly with it, the specific type of IPC, or the like.

In some exemplary embodiments, in response to Authorization Checking Module 320 detecting an unauthorized software entity in the list of software entities, Communication Module 310 may block the outgoing communication associated with the list. Additionally or alternatively, Communication Module 310 may prevent the outgoing communication from being transmitted, provide a report about the outgoing communication, provide a report about the unauthorized software entity, create an entry in a log, or the like.

In some exemplary embodiments, a Process Monitor 330 may be configured to monitor for loading of processes executing software entities. Process Monitor 330 may monitor dynamically-loadable code, executable code, or the like. Additionally or alternatively, Process Monitor 330 may be configured to monitor IPC between software entities. In some exemplary embodiments, Process Monitor 330 may be configured to report about loaded software entities and IPC therebetween to a Graph Creator 340.

In some exemplary embodiments, Graph Creator 340 may be configured to utilize information obtained from Process Monitor 330 to create a communication graph of the software entities and the IPC therebetween. Graph Creator 340 may be configured to create a directed graph, with nodes representing the software entities and edges representing the IPC between the software entities. In some exemplary embodiments, Graph Creator 340 may be configured to add a node to the communication graph, for each load of a process reported by Process Monitor 330. The added node may represent the software entity executed by the loaded process. Additionally or alternatively, Graph Creator 340 may be configured to add a directed edge in the communication graph connecting between a first node and a second node, for each IPC initiated by the software entity represented by the first node towards the software entity represented by the second node.

In some exemplary embodiments, the communication graph created by Graph Creator 340 may be utilized to determine a list of software entities that are associated with an outgoing communication. The communication graph may be analyzed directly to obtain the list. Additionally or alternatively, a COI from the node representing the transmitting entity may be created based on the communication graph; and analyzed to obtain the list.

In some exemplary embodiments, a COI Determination Module 350 may be configured to generate a COI from a node of the communication graph created by Graph Creator 340, representing the transmitting software entity. COI Determination Module 350 may provide a list of software entities associated with nodes in the COI to Authorization Checking Module 320.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   in response to an attempt to transmit an outgoing communication by a transmitting software entity, obtaining a list of software entities which have performed Inter-Process Communication (IPC) with the transmitting software entity, said obtaining the list comprising:
      determining a cone of influence in a communication graph from a node representing the transmitting software entity, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity;
      wherein the cone of influence comprises at least a node representing a software entity that performed IPC directly with the transmitting software entity, and a node representing a software entity that performed IPC indirectly with the transmitting software entity, wherein the list comprises each software entity that is associated with any node that is comprised in the cone of influence;
   determining whether any software entity in the list of software entities is an unauthorized software entity; and
   in response to detecting an unauthorized software entity in the list of software entities, blocking the outgoing communication,
   thereby preventing the transmitting software entity from transmitting outgoing communication.

2. The method of claim 1, wherein said checking comprises checking if the software entity is a member of an authorized programs list.

3. The method of claim 1, wherein said checking comprises checking if the software entity is a member of an unauthorized programs list.

4. The method of claim 1, wherein said checking comprises checking whether the software entity is an Internet browser or a Macro-executing application.

5. The method of claim 1 further comprising: monitoring IPC between the software entities, using the communication graph.

6. The method of claim 1, wherein said obtaining the list comprises analyzing the communication graph to obtain the list.

7. The method of claim 5 further comprises monitoring for loading of processes executing the software entities, wherein in response to a load of a process, adding a node to the communication graph.

8. The method of claim 1, wherein each software entity is selected from the group consisting of: a dynamically-loadable code and executable code.

9. A computer program product comprising a non-transitory computer-readable storage medium retaining program instructions, which program instructions when read by a processor, cause the processor to perform a method comprising:
   in response to an attempt to transmit an outgoing communication by a transmitting software entity, obtaining a list of software entities which have performed Inter-Process Communication (IPC) with the transmitting software entity said obtaining the list comprising:
      determining a cone of influence in a communication graph from a node representing the transmitting software entity, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity;
      wherein the cone of influence comprises at least a node representing a software entity that performed IPC directly with the transmitting software entity, and a node representing a software entity that performed IPC indirectly with the transmitting software entity,
   wherein the list comprises each software entity that is associated with any node that is comprised in the cone of influence;
   determining whether any software entity in the list of software entities is an unauthorized software entity; and
   in response to detecting an unauthorized software entity in the list of software entities, blocking the outgoing communication, thereby preventing the transmitting software entity from transmitting outgoing communication.

10. The computer program product of claim 9, wherein said checking comprises checking whether the software entity is an Internet browser or a Macro-executing application.

11. The computer program product of claim 9, wherein the method further comprises: monitoring IPC between the software entities.

12. The compute r program product of claim 11, wherein the method further comprises monitoring for loading of processes executing the software entities, wherein in response to a load of a process, adding a node to the communication graph.

13. The computer program product of claim 9, wherein each software entity is selected from the group consisting of: a dynamically-loadable code and executable code.

14. An apparatus having a processor and a memory device, wherein the memory device comprises the non-transitory computer-readable storage medium of the computer program product of claim 9.

15. A computer program product comprising a non-transitory computer-readable storage medium retaining program instructions, which program instructions when read by a processor, cause the processor to perform a method comprising:
in response to an attempt to transmit an outgoing communication by a transmitting software entity, obtaining a list of software entities which have performed Inter-Process Communication (IPC) with the transmitting software entity, said obtaining the list comprising:
determining a cone of influence in a communication graph from a node representing the transmitting software entity, wherein the communication graph is a directed graph, wherein a node of the communication graph represents a software entity, wherein a directed edge in the communication graph connecting between a first node and a second node represents an IPC initiated by a first software entity towards a second software entity, wherein the first node represents the first software entity, wherein the second node represents the second software entity;
wherein the cone of influence comprises at least a node representing a software entity that performed IPC directly with the transmitting software entity, and a node representing a software entity that performed IPC indirectly with the transmitting software entity,
wherein the list comprises each software entity that is associated with any node that is comprised in the cone of influence;
determining whether any software entity in the list of software entities is an unauthorized software entity; and
in response to detecting an unauthorized software entity in the list of software entities, logging in an event log an event associated with the outgoing communication,
thereby generating the event log for potential future analysis.

16. The computer program product of claim 15, wherein said checking comprises checking whether the software entity is an Internet browser or a Macro-executing application.

17. The computer program product of claim 15, wherein the method further comprises: monitoring IPC between the software entities.

18. The computer program product of claim 17, wherein the method further comprises monitoring for loading of processes executing the software entities, wherein in response to a load of a process, adding a node to the communication graph.

19. The computer program product of claim 15, wherein each software entity is selected from the group consisting of: a dynamically-loadable code and executable code.

* * * * *